United States Patent [19]

Wetmore et al.

[11] 4,448,277

[45] May 15, 1984

[54] SKIRTS AND SKIRT HANDLING FOR AIR CUSHION VEHICLES

[75] Inventors: Sherman B. Wetmore, Westminster; Gordon D. Knorr, Irvine, both of Calif.

[73] Assignee: Global Marine, Inc., Los Angeles, Calif.

[21] Appl. No.: 301,726

[22] Filed: Sep. 14, 1981

[51] Int. Cl.³ .............................................. B60V 1/16
[52] U.S. Cl. .................................................. 180/127
[58] Field of Search ................. 180/127, 128, 118, 122

[56] References Cited

U.S. PATENT DOCUMENTS 3,297,102 1/1967 Cockerell ............................ 180/118
3,776,360 12/1973 Anders et al. ...................... 180/127
4,258,817 3/1981 Hunt .................................... 180/127

Primary Examiner—John A. Pekar
Attorney, Agent, or Firm—Christie, Parker & Hale

[57] ABSTRACT

An air cushion vehicle has a plenum structure surrounding the vehicle body and a plurality of skirt segments. Each segment is attached to its own rigid frame which supports a flexible membrane. The frame outer end pivots from the plenum structure, while the frame inner end can move upwardly relative to the vehicle body from an inclined deployed position to a horizontal retracted position. The skirt membrane is extended from the frame during hovering and can be furled to its frame for replacement. The skirt segments are replaceable from inside the vehicle's air plenum.

14 Claims, 10 Drawing Figures

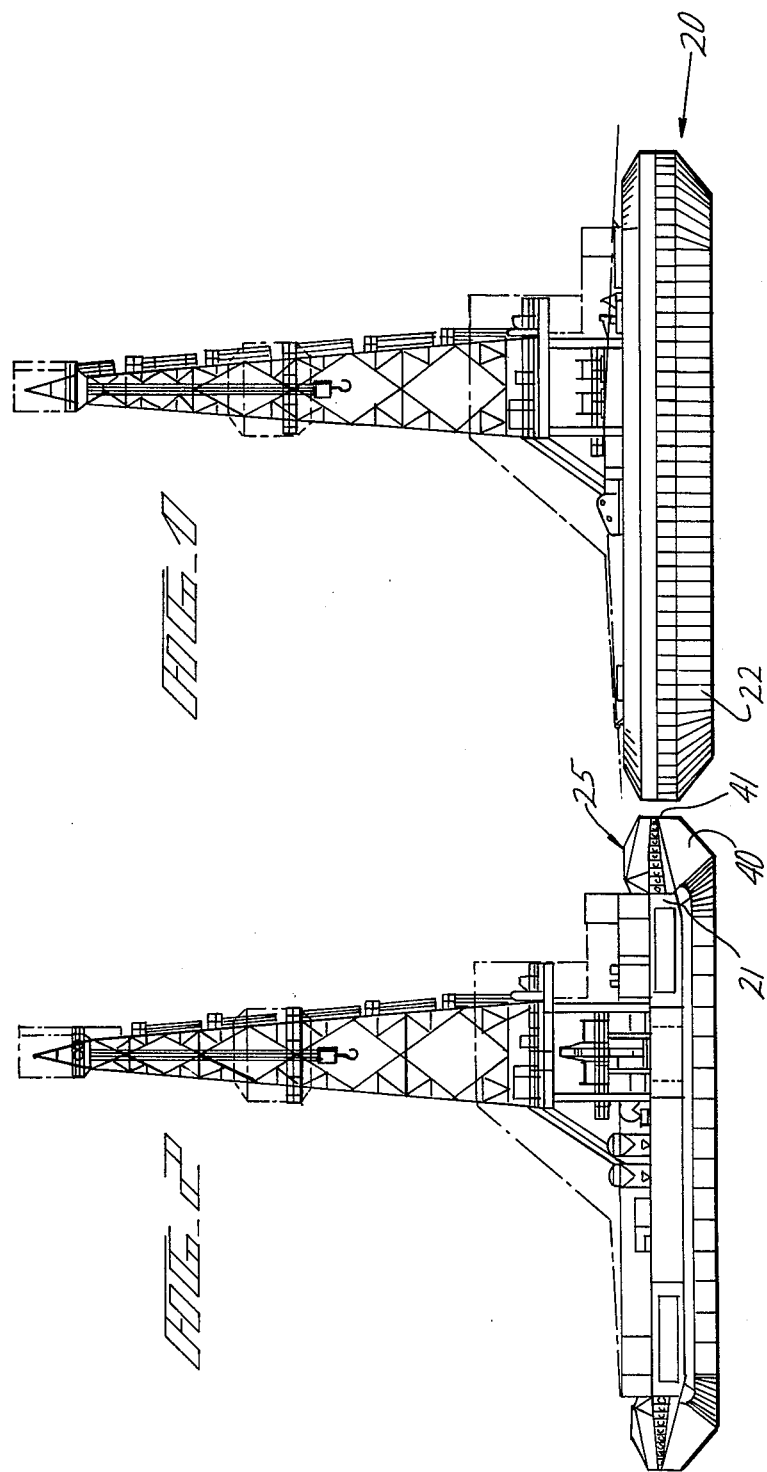

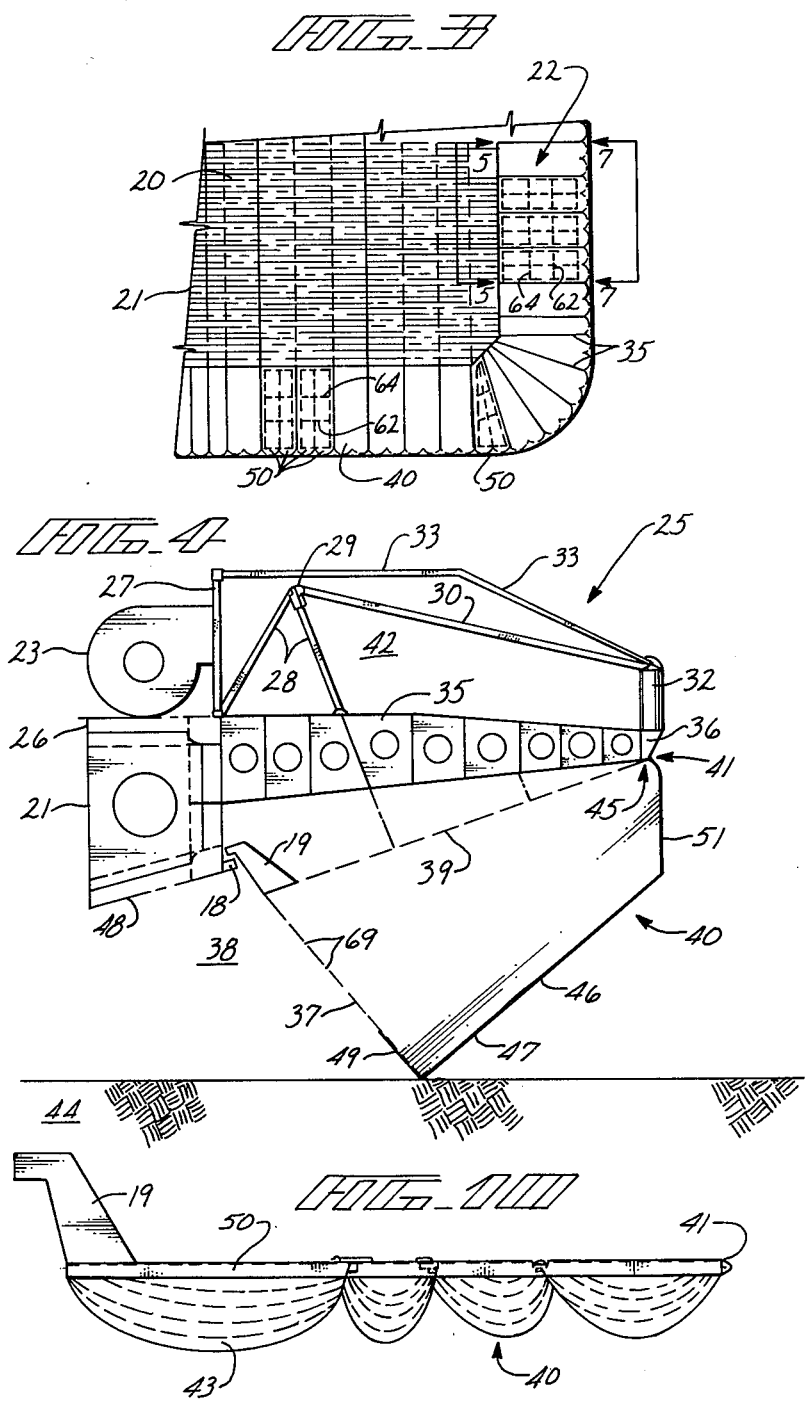

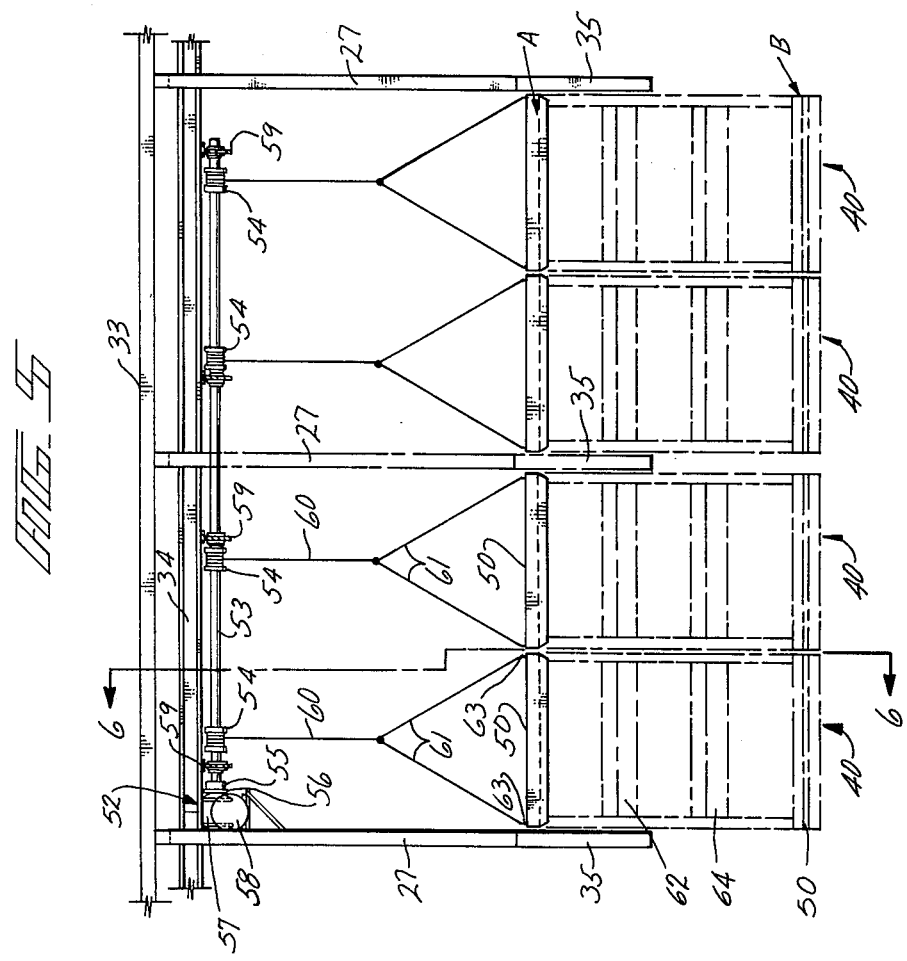

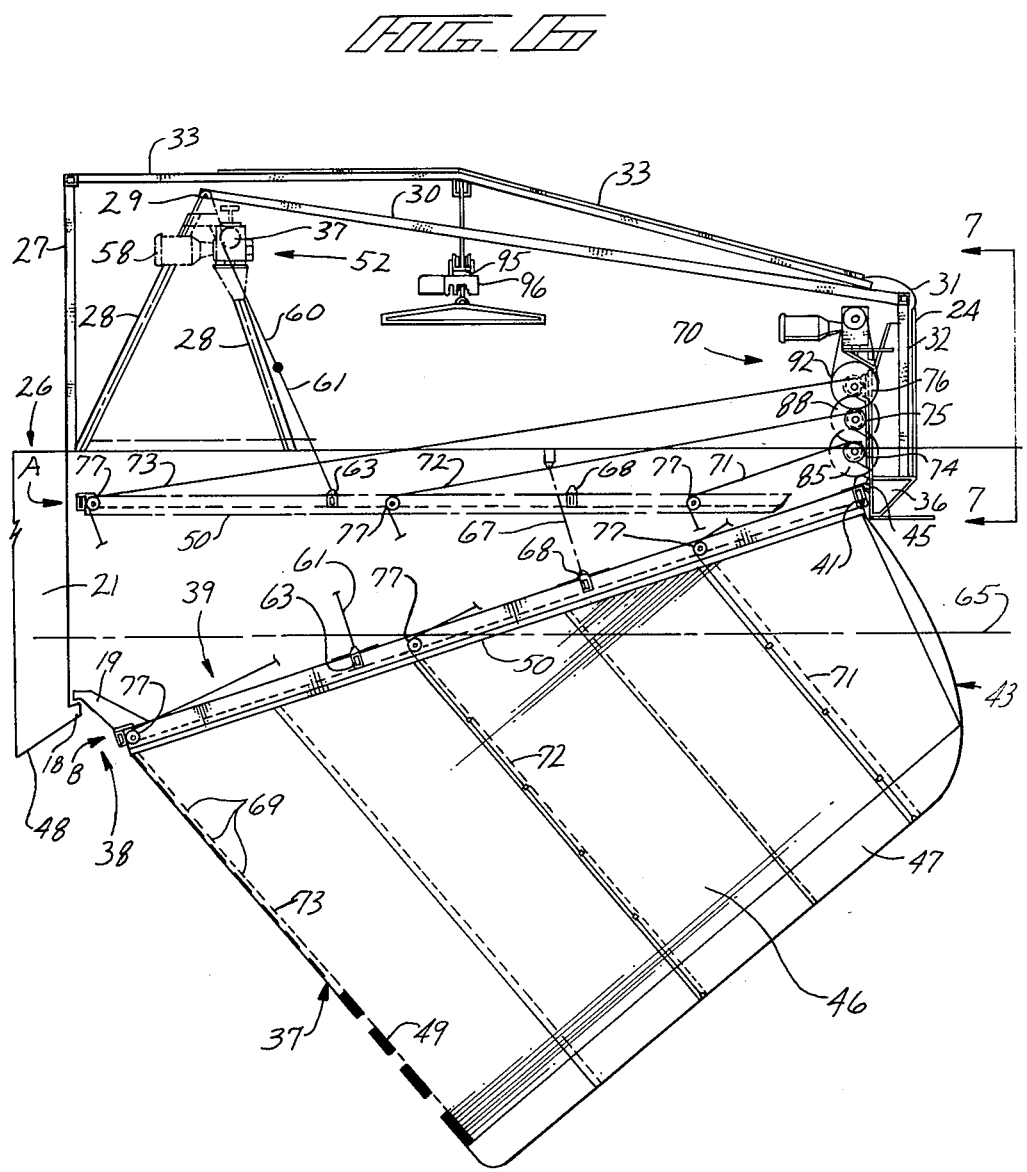

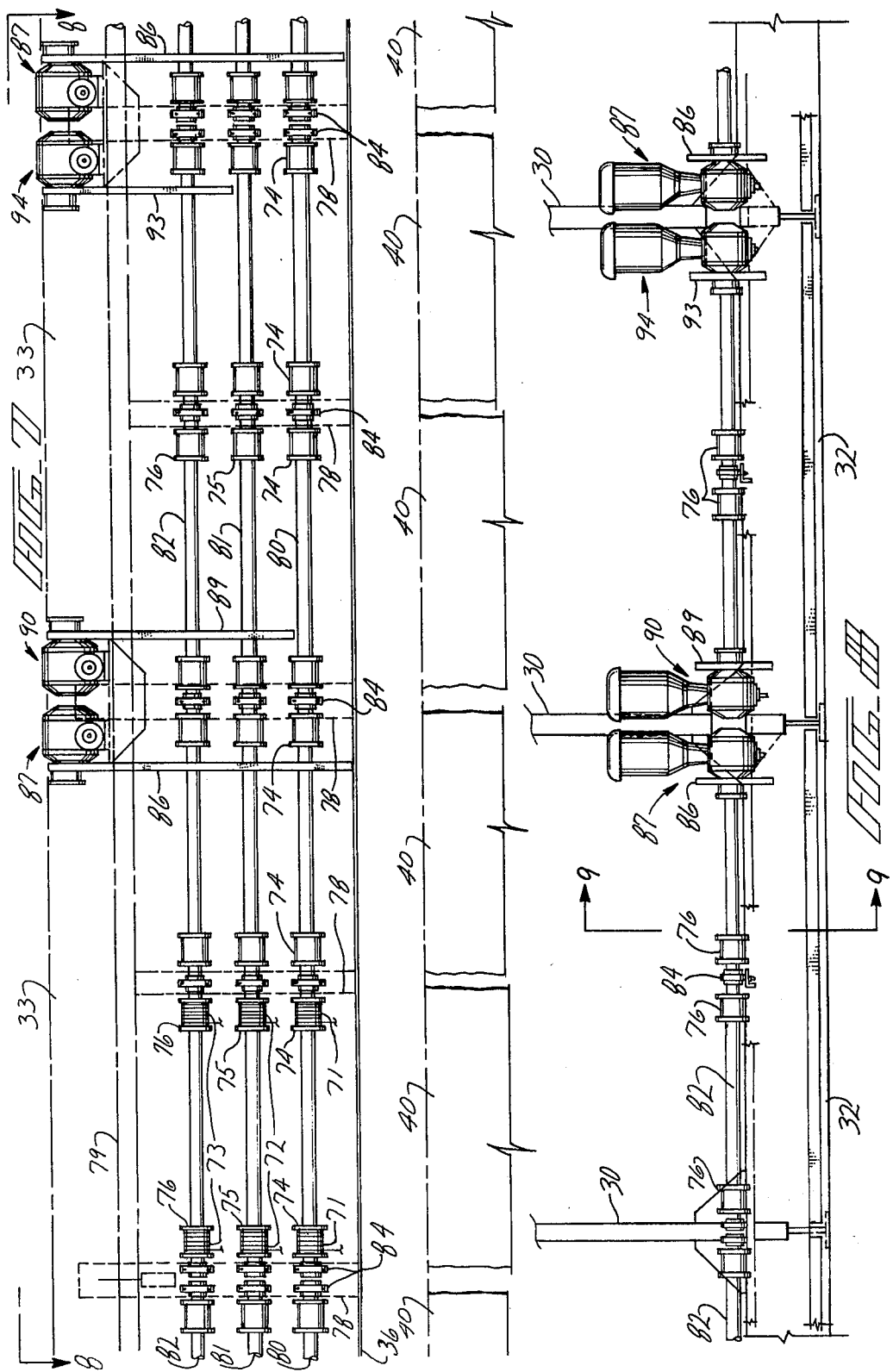

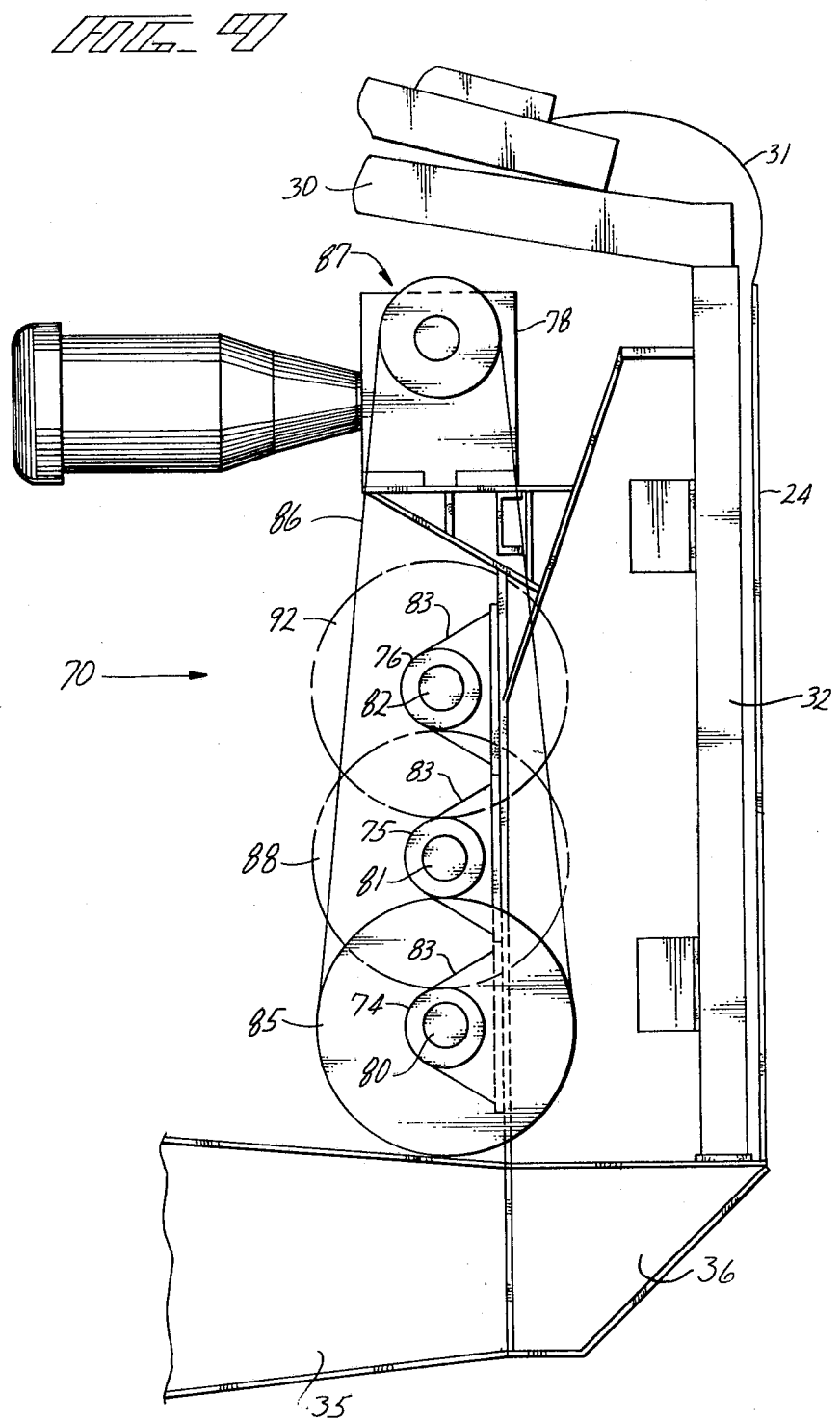

SKIRTS AND SKIRT HANDLING FOR AIR CUSHION VEHICLES

BACKGROUND OF THE INVENTION

Substantial reserves of oil and gas have been discovered in the northern areas of Canada and Alaska. These discoveries have been made both offshore and onshore where the land is covered by tundra. Tundra provides vegetative insulation for permafrost which lies below the land surface of these latitudes. The passage of wheeled vehicles a number of times across the tundra over the same route can destroy the insulation for permafrost until such time as the fragile tundra can reestablish itself. The reestablishment process usually requires the passage of years. In the meantime, the permafrost can thaw and cause subsidence of the land until conditions are stabilized upon reestablishment of the tundra.

Because of these circumstances, and others, air cushion vehicles have been used to advantage in the northern portions of Alaska and Canada and have been proposed for use as support vehicles for oil and gas drilling rigs. Air cushion vehicles are particularly useful in these areas because they are relatively insensitive to the nature of the surface over which they are used. Air cushion vehicles can be used to advantage over the topography of the Alaskan and Canadian arctic, particularly ice, water, land, or marshy areas. An air cushion vehicle is attractive for arctic missions because, no matter how massive, its weight is supported by a cushion of air which does not significantly harm tundra and its vegetation.

Air cushion supported vehicles use a skirt structure to enclose a space between the vehicle body and the surface over which the vehicle is moved on hover. The lower portions of the skirt provide a slidable seal between the space and the surface, and this seal is established and maintained by air which is supplied to the enclosed space at superatmospheric pressure, normally ¾ to 2 pounds per square inch above atmospheric pressure.

Various types of skirt designs exist for air cushion vehicles. A common type of air cushion vehicle skirt, and one which is widely used on air cushion vehicles in the Arctic, is that type of skirt known as the segmented skirt. In a segmented skirt, the overall skirt is defined by a plurality of pocket-like skirt segments which are mounted to a suitable support structure defined around the periphery of the vehicle hull, so that, when the several segments are properly mounted, they cooperate intimately with each other to provide the necessary enclosure to the hover space beneath the hull. The several segments are maintained in their desired configuration by hover air pressure which is supplied to them from a suitable source of pressurized air. This is typically a high-capacity, low-pressure blower carried aboard the vehicle which discharges to a suitable plenum structure via which hover air is supplied to the several skirt segments. Hover air can be supplied to the space enclosed by the skirt assembly via the skirt segments or both via the skirt segments and otherwise.

Where an air cushion vehicle is used over ice or land, a hazard exists that projections from the adjacent surface, such as a stump or sharp rock protruding from land or an ice pressure ridge protruding from an ice shelf, can damage the skirt structure. If the skirt is damaged, the efficacy of the skirt to establish and maintain the requisite seal around the enclosed spaces is diminished. A damaged skirt segment should be replaced as soon as possible before additional damage occurs to adjacent segments.

Present designs for segmented skirt assemblies for air cushion vehicles, while permitting replacement of damaged segments in the field, are also of such nature to require access to the damaged segment from the exterior of the vehicle. This is particularly disadvantageous where the need exists to replace a damaged skirt segment in an air cushion vehicle used in the Arctic. The extreme climatic conditions which prevail during the arctic winter may make it hazardous and inefficient for personnel to work outside the vehicle in order to accomplish skirt repairs.

It is therefore apparent that a need exists for equipment and procedures which enable repairs to be made to a damaged skirt segment from within the vehicle. The present invention is addressed to this need and provides equipment and procedures which enable the damaged skirt segment to be replaced completely from within the vehicle, rather than from outside the vehicle.

SUMMARY OF THE INVENTION

Therefore, in practice of this invention, according to a presently preferred embodiment, there is provided an air cushion vehicle having a body and a plenum structure carried by and projecting laterally from the body around a periphery thereof. A flexible skirt means is provided around the body periphery for cooperation with the surface below the body for defining and substantially sealing the space below the body and the surface. Means are provided for supplying air under pressure to the space for establishing and maintaining in the space sufficient pressure to support at least a major portion of the weight of the vehicle.

The skirt means includes a plurality of skirt assemblies each of which includes a flexible, air-impermeable skirt segment and a substantially rigid support frame for the segment. Each assembly has an outer end pivotally connected to the plenum structure and an inner end adjacent the body. The invention also provides a selectively operable means operable for moving the inner ends of the frames, and of the skirt segments carried thereby, between an upper retracted position and a lower deployed position relative to the body.

The invention also provides a method for replacing the skirt segments from inside the plenum of the air cushion vehicle. From within the plenum structure, a skirt segment of interest is disconnected from the plenum structure. The disconnected segment is placed at a desired location aboard the vehicle while a replacement skirt segment is provided at a selected location within the plenum structure. The replacement segment is moved within the plenum structure from the selected location to the location at which the segment of interest was connected to the plenum structure. The replacement segment is connected to the plenum structure from within the plenum structure in place of the segment which was previously disconnected.

DESCRIPTION OF THE DRAWINGS

These and other features and advantages of the present invention are more fully set forth in the following detailed description of a presently preferred embodiment of this invention, which description is presented with reference to the accompanying drawings, wherein:

FIG. 1 is a side elevation of an air cushion vehicle according to this invention;

FIG. 2 is a cutaway elevation of the air cushion vehicle of FIG. 1;

FIG. 3 is a plan view of a corner portion of the air cushion vehicle;

FIG. 4 is a simplified enlarged fragmentary side elevation of the vehicle's peripheral plenum structure showing a skirt assembly in its deployed position;

FIG. 5 is a fragmentary end elevation, taken along lines 5—5 of FIG. 3, of several skirt assemblies, as seen from a position inboard of the plenum structure and looking outboard, showing a portion of the skirt assembly retracting and deployment mechanism;

FIG. 6 is an enlarged fragmentary side elevation, taken along lines 6—6 of FIG. 5, of the plenum structure and a single skirt segment;

FIG. 7 is an elevation of the skirt furling system, taken along lines 7—7 of FIGS. 3 and 6;

FIG. 8 is a plan view taken along lines 8—8 of FIG. 7;

FIG. 9 is an enlarged elevation taken along lines 9—9 of FIG. 8, of a winch used in furling the skirts; and FIG. 10 is a side elevation of an individual skirt assembly with the skirt segment furled.

DESCRIPTION OF THE ILLUSTRATED EMBODIMENT

FIG. 1 illustrates a side elevation of a drill rig mounted on an air cushion vehicle (ACV) 20 constructed according to principles of this invention. As illustrated in this embodiment, the air cushion vehicle comprises a rectangular body or hull 21 forming the principal structural component of the vehicle. Surrounding the hull 21 is a plenum structure 25 which extends laterally beyond the body in an inboard to outboard direction. As may be more clearly seen in FIGS. 2-6, the plenum structure comprises a cantilevered structure which extends out from, and around, the entire perimeter of the main hull structure or body 21. A flexible skirt 22 is suspended from plenum structure 25.

Illustrative of the scale of vehicle 20, a preliminarily designed exemplary embodiment has the following characteristics:

overall length: 60.32 m
overall beam: 49.12 m
depth of hull: 3.0 m
maximum weight loaded: 5020 kips
plenum span outboard of hull gunwale: approx 7.5 m
hover height: 2.45 m The type of skirt used in this ACV is a "segmented skirt" in which the overall vehicle skirt is comprised of a plurality of contiguous pocket-like skirt segments 40 individually mounted to plenum structure 25. The plenum structure is a frame-like construction which extends around the periphery of the vehicle body 21 or hull and which extends in cantilever fashion from the body. The space inside the plenum structure 25 above skirt segments 40 forms an air plenum 42.

When the vehicle is operated in its air-cushion mode, it is supported above a subadjacent surface 44 on a cushion of air generated in a space 38 between the body and the surface, the space being enclosed by the skirt which cooperates with the surface to substantially seal the perimeter of the space from leakage of air, present in the space at superatmospheric pressure, from the space. The air pressure in the space, called the "hover pressure", depends upon the weight of the vehicle and the horizontal area of the vehicle upon which the hover pressure can act. Preferably, the hover pressure is in the range of 1 to 2 psig.

The individual skirt segments 40 are essentially identical to each other and are fabricated principally of an air-impervious membrane, such as a rubber-coated nylon fabric. The skirt segments, when deployed and filled with air, have a configuration which generally resembles the bowl of a deep-bowl hand scoop and are elongate in a direction normal to the periphery of space 38.

A filled segment has a closed outer end 51 outboard of the vehicle and a U-shaped non-open inner end 37 with perforations 69 located more inboard of the vehicle. The holes 69 permit passage of hover air from inside the skirt to space 38 under the vehicle. The segments have vertical sidewalls 46 between their ends and increase in depth from their outboard to their inboard ends. The bottom 47 of each segment, i.e., the portion of the segment between its sidewalls, slopes downwardly and inwardly from the outboard to the inboard end of the segment; the slope angle preferably is about 40°.

In use, the segment is inflated by hover air introduced under pressure from a high capacity, low pressure blower 23, shown in FIG. 4, flowing from plenum 42 into segment tops 66, urging the sidewalls 46 of adjacent segments into intimate surface to surface contact. The seal between each segment 40 and the surface 44 over which the vehicle hovers or moves is formed by cooperation between the surface and the lower inboard portion of the bottom of the segment.

Segmented skirts have the feature that they adapt to uneven surfaces better than continuous or nonsegmented skirts and make it possible for the vehicle to pass over stumps and the like projecting from the ground surface. A stump can pass between adjacent segments. Also, if a portion of the skirt becomes worn or torn, only the damaged segments, not the entire skirt, need be replaced.

In prior segmented-skirt air-cushion vehicles, the usual practice has been to mount the individual skirt segments to the vehicle in a removable manner, but in a way that makes replacement of a damaged segment difficult and time-consuming, e.g., by the use of nuts and bolts, and that requires access to the skirt segment from both inside and outside the skirt. Such skirt segment mountings are considerably less than satisfactory in the case of air cushion vehicles intended for use year-round in Arctic or similar regions.

In this ACV, the individual segments 40 are attached to the plenum structure 25 so that individual segments are easily and quickly changed from the inside of air plenum 42 in the event they are damaged during operation. Each flexible skirt segment 40 is attached to the plenum structure by a tray-like segment carrier frame 50. The outer end 41 of each frame is hinged to plenum structure 25. There is a hinge 45 corresponding to each segment 40. The inner end of each frame includes a hook 19 which couples, when the skirt is inflated, to an inboard structural support 18 extending from the hull, as illustrated in FIG. 4. Thus both the inner and outer ends of the frame are secured in place when the skirt is inflated. The frame 50 is generally rectangular and occupies, in plan, substantially the area of its respective skirt segment, as shown in FIG. 3.

The space inside the plenum structure above skirt segments 40 forms air plenum 42. The upper edge 39 of each of the segments 40 is open so that air from a high capacity, low pressure blower 23, shown in FIG. 4, flowing into plenum 42 can flow downwardly into the segments. For this purpose, each frame has a form that does not impede air flow into the segments; i.e., of a perimetral framework having an open interior with cross members 62 and 64, which are best seen in FIG. 3, and in ghost figure in FIG. 5, corresponding to a fully-deployed position "B", which will be discussed in greater detail below.

Air under superatmospheric pressure from blower 23 is pumped into plenum 42 to inflate the skirts. Air passes through holes 69 in inner ends 37 of the skirt segments and enters and fills space 38 between the inner ends 37 of the skirts under the bottom 48 of the hull. The skirt cooperates with surface 44 to substantially seal space 38 from leakage of air. During operation, pressurizing air is injected from blower 23 into the plenum 42 and flows around the vehicle body 21 so as to substantially equalize the pressure therein. The air is under a pressure sufficient to support at least a major portion of the weight of the vehicle.

The skirt is capable of sealing over several different types of surfaces with minimum air loss. The basic profile configuration of the skirt segments 40 is fixed by vehicle roll and pitch stability considerations. A segment slope (i.e., the angle measured from the bottom 47 of the segment 40 to a level horizontal surface 44) of about 40° gives a satisfactory compromise between vehicle hover stability and segment size. To help the skirt membranes retain their shape and pass over objects, and for better water drain, the lower portion 49 of air permeable U-shaped skirt inner end 37 is reinforced for a height of about four feet.

The plenum structure 25 is shown in FIGS. 4-6 and extends from main deck 26 of the hull. The plenum structure is built up from a series of I-webbed plate beams 35 which extend outwardly from main deck 26 to the outer perimeter of the plenum structure. In the presently preferred embodiment the plate beams are disposed every 2.8 m around the sides and ends of hull 21. Between each pair of plate beams 35 are disposed a pair of individual skirt segments 40, as seen in FIG. 5.

In FIG. 4, each plate beam 35 supports a pair of tubular stanchions 28 which are interconnected at a pinned joint 29 to form a truss with a tubular beam 30 which runs from pinned joint 29 to an outside perimeter bulkhead 32 which in turn is secured at its lower end 36 to plate beams 35. The connection 31 between beam 30 and bulkhead 32 is preferably a sliding joint to allow for relative structural deflection of the plenum structure. The pinned joints 29 are laterally supported by a bearing support web 34, shown best in FIG. 5, which runs around the perimeter of the hull between pinned joints 29. A side panel 24 running around the perimeter of the plenum structure provides an airtight seal between perimetral web 36 and sliding joint 31.

FIG. 6 is an enlarged fragmentary side elevation of the plenum structure and an individual skirt segment 40. A flexible membrane 43 which defines the skirt segment is secured at its open upper edge to a corresponding rigid support frame 50. The outboard end of the frame is pivotally connected to hinge 45 at the lower end 36 of outside perimeter bulkhead 32. The frame inner end can thus move between a substantially horizontal retracted position A and a lowered fully deployed position B, where the frame inner end is substantially inclined toward the bottom surface 48 of the vessel.

In FIG. 6, the segment is shown in detail in fully deployed position B. Only a portion of frame 50 is shown in broken (phantom) line in retracted position A for purposes of illustration and clarity. Air plenum 42 is formed by the space inside plenum structure 25 and skirt segments 40. When the skirt segment is in the lowered position B, a supply of air at superatmospheric pressure to plenum 42 causes membrane 43 to expand fully and the vehicle to hover.

FIG. 5 is a fragmentary end elevation of several skirt assemblies taken from a position inboard of the plenum structure. The frame 50 is shown edge-on in solid lines in retracted position A. The structure of the frame is shown more fully in broken (phantom) lines in fully-deployed position B, along with cross-members 62 and 64.

To move the skirt segments between raised position A and lowered position B, skirt retraction winches 52 are provided inside air plenum 42. The winches are located under bearing support web 34 and are supported by stanchions 28. Winches 52 are provided because each assembly of a frame 50 and its associated skirt segment weigh on the order of 545 kilograms.

In FIG. 5, a winching arrangement is shown for four adjacent skirt segments 40. The winch 52 is a direct-drive arrangement and includes a drive shaft 53, which interconnects a series of winching drums 54 with a clutch 55, flywheel 56, reduction transmission 57, and electric motor 58. The drive shaft is, in turn, supported by bearings 59, which are mounted to bearing support web 34. Preferably, electric motor 58 includes a brake.

There is an individual winching drum 54 for each skirt segment 40. A support cable 60 is wound from drum 54 and is coupled to a bridle 61, which is connected to a pair of eyebolts 63 on either side of frame 50. Cable 60 supports beam loads of an intermediate portion of frame 50, while the frame outboard end is pivotally connected to hinge 45 at its respective location on the outer portion of the plenum structure. The frame inner end is supported when deployed by the coupling between frame hook 19 and structural seat 18.

Preferably, an auxiliary support cable 67 is hung from plate beam 35 to an eyebolt 68 on frame 50 intermediate the length of the frame to also support beam loads of frame 50 and provide backup support for the frame in the event of breakage of cable 60. For these purposes, cable 67 has a length sufficient to be in tension when the frame is in the fully deployed position B.

Each retraction winch 52 controls movement of a group of four individual skirt segments from inclined fully deployed position B to substantially horizontal retracted position A, or vice versa. The skirts are retracted when it is time to change an individual skirt segment which has become damaged or worn out, or when the skirts are not needed for support of the vehicle. Reports of laboratory testing of conventional skirt membrane materials indicate a 25% to 35% deterioration in tear strength when materials of the type specified for an air cushion vehicle are constantly immersed in water.

When the skirt segment 40 is in the inclined fully deployed position B, the inner portion of the skirt bottom is at or below the waterline of the vessel. However, water in Arctic regions often freezes, which can trap the skirt segments in ice. Freeing skirt segments from ice is slow and often results in cutting and tearing of the skirt material. The air cushion vehicle preferably has a skirt retraction capability so as to minimize these problems. Moreover, it is simpler to change skirt segments dry, rather than when full of water.

The air cushion vehicle also includes a skirt furling mechanism 70. A series of cables 71, 72, and 73 interconnect the bottom of the flexible skirt material 43 with, respectively, winching drums 74, 75, and 76. The cables are reeved through pulleys 77 along the sides of the frame. There is a pair of cables 71, 72, or 73 for each skirt segment. Each cable is connected to the bottom of membrane 43 near either skirt segment side wall. The cables 71 control the deployment and furling of the outer portion of segment membrane 43, while cables 72 control the inter mediate portion, and cables 73 control the innermost portion.

The arrangement of the winching drums is shown more clearly in FIGS. 7-9. In FIG. 8, which is a plan view of the outboard portion of plenum structure 25, tubular beams 30 are interconnected with outside perimeter bulkhead 32. A series of furling support beams 78 interconnects plate beams 35 with a perimetral beam 79 which, in turn, interconnects tubular beams 30. Beams 78 and beam 79 provide a framework to support the skirt furling mechanism 70.

Three horizontal drive shafts 80, 81, and 82 are vertically staggered under beam 79. Each shaft is held in place by a support frame 83 connected to beam 78. The shafts 80, 81, and 82 carry, respectively, winching drums 74, 75, and 76 which reeve, respectively, skirt furling cables 71, 72, and 73. Each skirt segment 40 has three pairs of furling cables. Thus, for example, there are two skirt furling cables 71, each of which are wound on one of a pair of a respective winching drums 74 associated with either side edge of an individual skirt segment.

Drive shaft 80 is rotatably received by bearings 84 which are rigidly mounted to beam 78. Bearings 84 are preferably similar to bearings 59 used in the skirt retraction winch 52, as discussed previously. Drive shaft 80 carries a sprocket 85 which is driven by a belt 86 and an electric motor and transmission 87. The electric motor and transmission are similar to those described with reference to retraction winch 52. The furling mechanism, however, is a belt drive arrangement instead of a direct drive. Drive shaft 80 extends between four adjacent skirt segments 40. Thus, electric motor and transmission 87 shown in FIGS. 7-9 drives winching drums 74 for four adjacent skirt segments 40 to control the furling of cables 71 at the outboard end of the skirts.

Drive shafts 81 and 82 are arranged similarly to drive shaft 80. Thus, drive shaft 81 carries winching drums 75 which are driven by a sprocket 88 and a belt 89 operated by electric motor and transmission 90. Motor 90 controls the furling of the intermediate portion of the same four skirt segments. Similarly, drive shaft 82, which controls the furling of the inboard portion of skirt membrane 43, carries winching drums 76 which are driven by a sprocket 92 and a belt 93, which is in turn driven by electric motor and transmission 94. Thus, skirt furling is controlled separately in groups of four skirts by cables which are reeved on three shafts 80, 81, and 82. Each electric motor and transmission controls a set of four adjacent skirt segments so that it is not necessary to provide separate motors and transmissions for each segment.

When a deployed skirt is to be retracted, hook 19 is uncoupled from support 18 at the inboard edge of the skirt. Retraction winch 52 is then operated so as to increase tension on cable 60 and chain bridle 61. This causes the inner end of the skirt segment to rotate upward to substantially horizontal retracted position A as cable 60 is wound on winching drum 54. At this position, the entire skirt frame 50 is in a substantially horizontal position about 1 meter above the waterline 65 of the vessel defined at maximum draft.

With the skirt segment in the retracted position, the skirt membrane is furled on its frame by operating skirt furling mechanism 70. First cables 71 are drawn in by operating electric motor and transmission 87 to drive shaft 80 and winching drum 74. The outer portion of the skirt membrane is furled on its frame in response to winding of cables 71 on winching drum 74. Any water that might be present in the bottom of the skirt is drained from the outboard part of the skirt and is displaced to the inboard sections of the skirt and then to space 38 through the permeable membrane 49. Next, cables 72 are wound on winching drums 75 by operating electric motor and transmission 90 and drive shaft 81. Finally, the inboard portion of membrane 43 is furled on frame 50 by operating electric motor and transmission 94 to cause cables 73 to wind on winching drums 76. Any water remaining in the inboard section of the skirt flows over through permeable membrane 49 and runs out into space 38 between the skirt segments and the bottom surface 48 of the hull.

The skirt membranes are furled on their frames in a stepwise manner so that any water in the segment is drained off. Conversely, the membranes are deployed from the frames when the frame is in the raised position by letting out cables 71, 72, and 73 preferably in the same order as they were taken in during the furling sequence.

Preferably, there is an overhead rail 95 which runs around the inside of plenum 42 below tubular beams 30 approximately over the midlength of plate beams 35. The overhead rail supports an electric trolley hoist 96 which is used for replacing skirt segments. The trolley hoist is movable over the connected skirt segments to any desired location peripherally of the vehicle body. The hoist preferably is capable of lifting several tons.

When it is time to replace a skirt segment, the trolley hoist 96 is positioned over the segment of interest. A suitable coupler or hook is lowered to the corresponding skirt segment carrier frame, and the weight of the segment and frame is transferred to the hoist. The outboard end 41 of the frame is disconnected from hinge 45, while chain bridle 61 and auxiliary support cable 67 are disconnected from eyebolts 63 and 68, and furling cables 71, 72 and 73 are also disconnected from the skirt segment. At this point, the skirt segment has been disconnected from the plenum structure. The trolley hoist is then operated to raise the segment toward the overhead rail and rotate the skirt segment and frame by about 90°. Once over the remaining connected skirt segments, the skirt segment of interest is moved within the plenum structure by use of the trolley to a selected repair station aboard the vehicle. The segment is then removed from the hoist for repair as appropriate.

A supply of spare skirt segments is stored inside air plenum 42 under the roof panels. The skirt membranes 43 preferably have been pre-installed on carrier frames 50 so that they can be installed as an assembly. To replace the removed skirt segment, a replacement segment with its own frame is provided within the plenum structure at a location where it is connectible to the hoist. The segment and its frame are coupled to trolley hoist 96. The replacement segment is then moved within the plenum structure through the agency of the trolley hoist to the location at which the segment of interest was connected to the plenum structure.

The outboard end of the frame is then pivotally connected to hinge 45, and chain bridle 61 is then secured to eyebolts 63. Skirt furling cables 71, 72, and 73 are reeved through the appropriate pulleys 77 and secured to the skirt membrane. Auxiliary bean loading support cable 67 is coupled to the frame. Cable 60 is tensioned, and the weight of the segment assembly is shifted from trolley hoist 96 to cables 60 and 67, and hinge 45. The trolley hoist is disconnected from the frame, and the replacement segment has been connected to the plenum structure in place of the removed segment, all from within the plenum structure.

While the newly installed skirt frame is still in the substantially horizontal retracted position A, which is above the waterline 65, the skirt furling mechanism is put into operation. The skirt membrane 43 is deployed by sequentially paying out cables 71, 72, and 73 by selectively operating, respectively, motors 87, 90, and 94 to turn the corresponding winching drums. Air under superatmospheric pressure from plenum 42 inflates skirt membrane 43.

To fully deploy the segment, retraction winch 52 is operated to pay out cable 60 to cause frame 50 to swing from retracted horizontal position A to fully-deployed inclined position B. The inboard end of the frame is then coupled to structural seat 18 by the agency of hook 19. During this movement, the inner end of the frame moves downwardly relative to the vehicle body while the outboard end of the frame pivots about hinge 45. When fully deployed, the inflated skirt membrane provides an air pumped seal between vehicle 20 and a surface 44 over which the vehicle can hover.

The upper outboard end 41 of the skirt segment at hinge 45 is preferably always above the waterline of the vessel, even when the vessel is floating at a maximum draft, to facilitate changing of skirt segments from inside air plenum 42.

EXAMPLE OF A PREFERRED EMBODIMENT

In the presently preferred embodiment of this invention, some characteristics of which have been set forth above, a total of 144 segments 40 are deployed around the vessel perimeter. Each individual segment is 1.4 m wide. Thirty segments are used along each side of the vessel, with twenty-two segments across each end and ten segments at each corner of the air cushion vehicle 20.

The vehicle has a design hover height of 2.45 meters for enabling the unit to traverse rough ice, which is expected in the Arctic Islands. Hinge 45 defines an attachment point for the segments, which is about 0.95 meters above the water when the air cushion vehicle is floating at a maximum draft of about 1.375 meters. When deployed, individual segments have a 40° segment slope relative to a horizontal surface of the earth.

The material used for the skirt segments is a nylon fabric coated with natural rubber, manufactured by Avon Rubber Company Limited and marketed under the trademark, Avon 4275 TM. This is a coated fabric having a weight of about 3.34 kg/cm$^2$ with a gauge of about 3.20 mm. The fabric has a tensile strength along the warp of 143 kg/cm and along the weft of 116 kg/cm. Bird's wind-tear strength is about 91 kg/cm for both the warp and the weft. The skirt material has a rubber fabric adhesion of about 21 kg/cm determined by the direct-tension method.

It is to be understood that what has been described is merely illustrative of the principles of the invention in the context of that embodiment of the invention which is presently preferred and which is presently regarded as the best mode of practicing the invention. The preceding description is not exhaustive of all forms in which the invention may be embodied. Numerous arrangements in accordance with this invention may be devised by those skilled in the art without departing from the spirit and scope thereof.

What is claimed is:

1. A method for replacing a skirt segment of a segmented skirt for an air-cushion vehicle in which the skirt is disposed circumferentially of a body of the vehicle and is composed of a plurality of segments, each of which is connected to an enclosed plenum structure which extends peripherally of the vehicle body, the method comprising the steps of:
    (a) from within the plenum structure,
        (i) disconnecting from the plenum structure a skirt segment of interest, and
        (ii) placing the disconnected segment at a desired location aboard the vehicle;
    (b) providing a replacement skirt segment at a selected location within the plenum structure;
    (c) moving the replacement segment within the plenum structure from the selected location to the location at which the segment of interest was connected to the plenum structure; and
    (d) from within the plenum structure connecting the replacement segment to the plenum structure in place of the segment removed in performance of step (a)(i).

2. The method according to claim 1 wherein each skirt segment is connected to the plenum structure via a respective frame to which the skirt segment is connected, each frame in turn being removably connected to the plenum structure, the method further comprising the steps of:
    (a) disconnecting the skirt segment of interest from the plenum structure by disconnecting from the plenum structure the frame to which the segment of interest is connected;
    (b) providing the replacement segment at the selected location with its own frame to which the replacement segment is connected;
    (c) moving the replacement segment with its frame within the plenum strucure; and
    (d) connecting the replacement segment to the plenum structure by connecting to the plenum structure the frame to which the replacement segment is connected.

3. The method according to claim 2 including the further steps of:
    (a) furling the skirt segment of interest on its frame prior to disconnection of the frame from the plenum structure;
    (b) providing the replacement skirt at the selected location in a furled state on its frame; and
    (c) maintaining the replacement skirt segment furled on its frame during the course of movement of the segment from the selected location and connection of the replacement segment frame to the plenum structure.

4. The method according to claim 1 including:

(a) providing in the plenum structure a trolley movable over the connected skirt segments to any desired location peripherally of the vehicle body;
(b) moving the skirt segment of interest in the plenum structure after disconnection thereof from the plenum structure by use of the trolley; and
(c) moving the replacement skirt segment in the plenum structure by use of the trolley.

5. A method for retracting a skirt assembly of an air-cushion vehicle relative to a body of the vehicle, the skirt assembly extending peripherally of the vehicle and being of the segmented type in which the skirt assembly is comprised of skirt segments respectively connected to a plenum structure defined peripherally of the body at least a plurality of skirt segments disposed along each side of the body, the method comprising the steps of:
(a) connecting the skirt segments to substantially a corresponding plurality of frames which have inner ends adjacent the vehicle body and outer ends spaced from the body;
(b) hingeably connecting only a selected end of each frame to structure fixed to the vehicle body;
(c) moving the unhinged ends of the frames upwardly relative to the vehicle body, thereby to retract the segments relative to the body; and
(d) furling the skirt segments relative to their frames.

6. The method according to claim 5 wherein the step of furling the skirt segments is performed after the frames have been moved upwardly relative to the vehicle body.

7. An air cushion vehicle comprising:
a vehicle body;
a plenum structure carried by and projecting laterally from the body around a periphery thereof;
flexible skirt means around the body periphery for cooperation with a surface below the body for defining and substantially sealing a space below the body between the body and the surface;
means for supplying air under pressure to the space for establishing and maintaining in the space sufficient pressure to support at least a major portion of the weight of the vehicle,
the skirt means comprising a plurality of skirt assemblies, each comprising a flexible, air-impermeable skirt segment and a substantially rigid support frame for the segment, each assembly having an outer end pivotally connected to the plenum structure and an inner end adjacent the body; and
selectively operable means operable for moving the inner ends of the frames, and of the skirt segments carried thereby, between an upper retracted position and a lower deployed position relative to the body.

8. The air cushion vehicle as defined in claim 7 further comprising means for furling the skirt segments relative to their respective frames.

9. An air cushion vehicle as defined in claim 8 wherein the furling means comprises winch means, and at least one flexible line connected to each skirt segment at a selected location thereof and connectible to the winch means to be taken in or payed out thereby.

10. An air cushion vehicle as defined in claim 9 including a plurality of cable pairs connecting each skirt segment at spaced locations therealong relative to the outer end of the respective skirt assembly.

11. An air cushion vehicle as defined in claim 10 wherein there are three cable pairs per skirt segment.

12. An air cushion vehicle as defined in claim 7 wherein the selectively operable means comprises retraction winch means, and cable means connectible between the winch means and the frames at locations spaced from the first ends of the skirt assemblies.

13. An air cushion vehicle as defined in claim 7 further comprising a trolley hoist movable over the connected skirt segments to any desired location peripherally of the vehicle body.

14. An air cushion vehicle as defined in claim 7 wherein the frames, the plenum structure and the mountings of the frames to the plenum structure are cooperatively arranged to enable the skirt segments to be replaced from within the plenum structure.

* * * * *